Dec. 31, 1935. L. G. COPEMAN Re. 19,798

REFRIGERATOR STRUCTURE

Original Filed Dec. 23, 1933 5 Sheets-Sheet 1

INVENTOR.
Lloyd G. Copeman

BY
Barnes, Kisselle & Laughlin
ATTORNEYS

REFRIGERATOR STRUCTURE
Original Filed Dec. 23, 1933 5 Sheets-Sheet 2
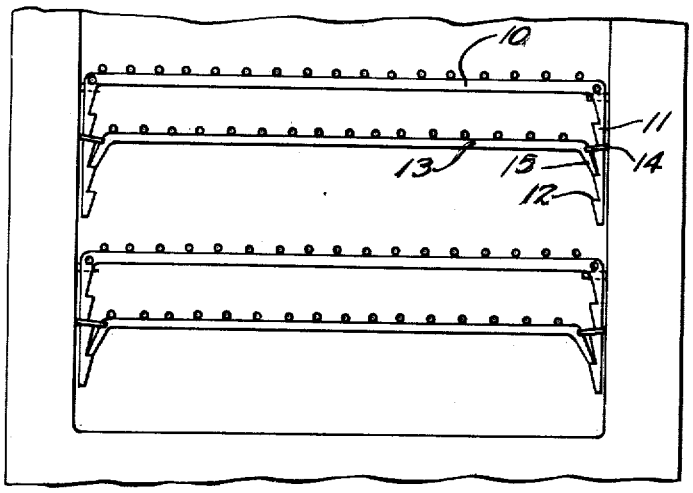
Fig. 2
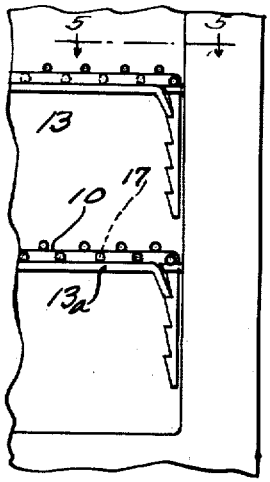
Fig. 3
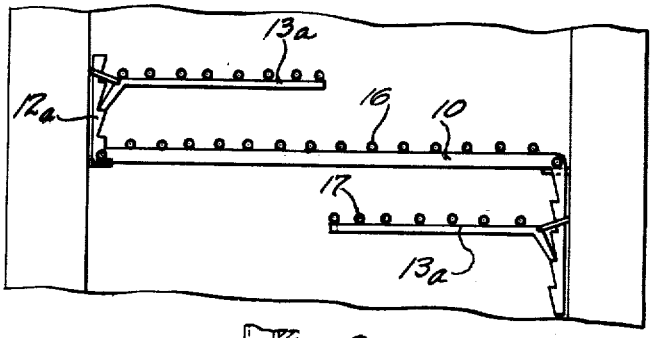
Fig. 4
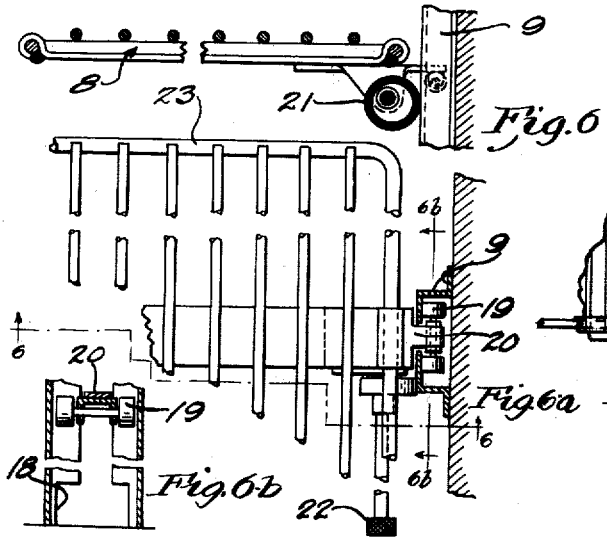
Fig. 6
Fig. 6a
Fig. 6b
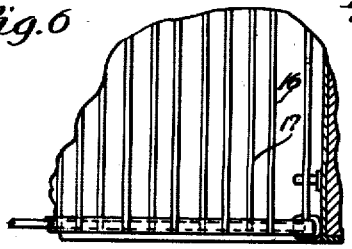
Fig. 5
INVENTOR.
Lloyd G. Copeman
BY
Barnes, Kisselle & Raubline
ATTORNEYS.

Dec. 31, 1935. L. G. COPEMAN Re. 19,798

REFRIGERATOR STRUCTURE

Original Filed Dec. 23, 1933 5 Sheets-Sheet 3

INVENTOR.
Lloyd G. Copeman

BY
Barnes, Kisselle & Raugh[illegible]
ATTORNEYS

Dec. 31, 1935. L. G. COPEMAN Re. 19,798
REFRIGERATOR STRUCTURE
Original Filed Dec. 23, 1933 5 Sheets-Sheet 4
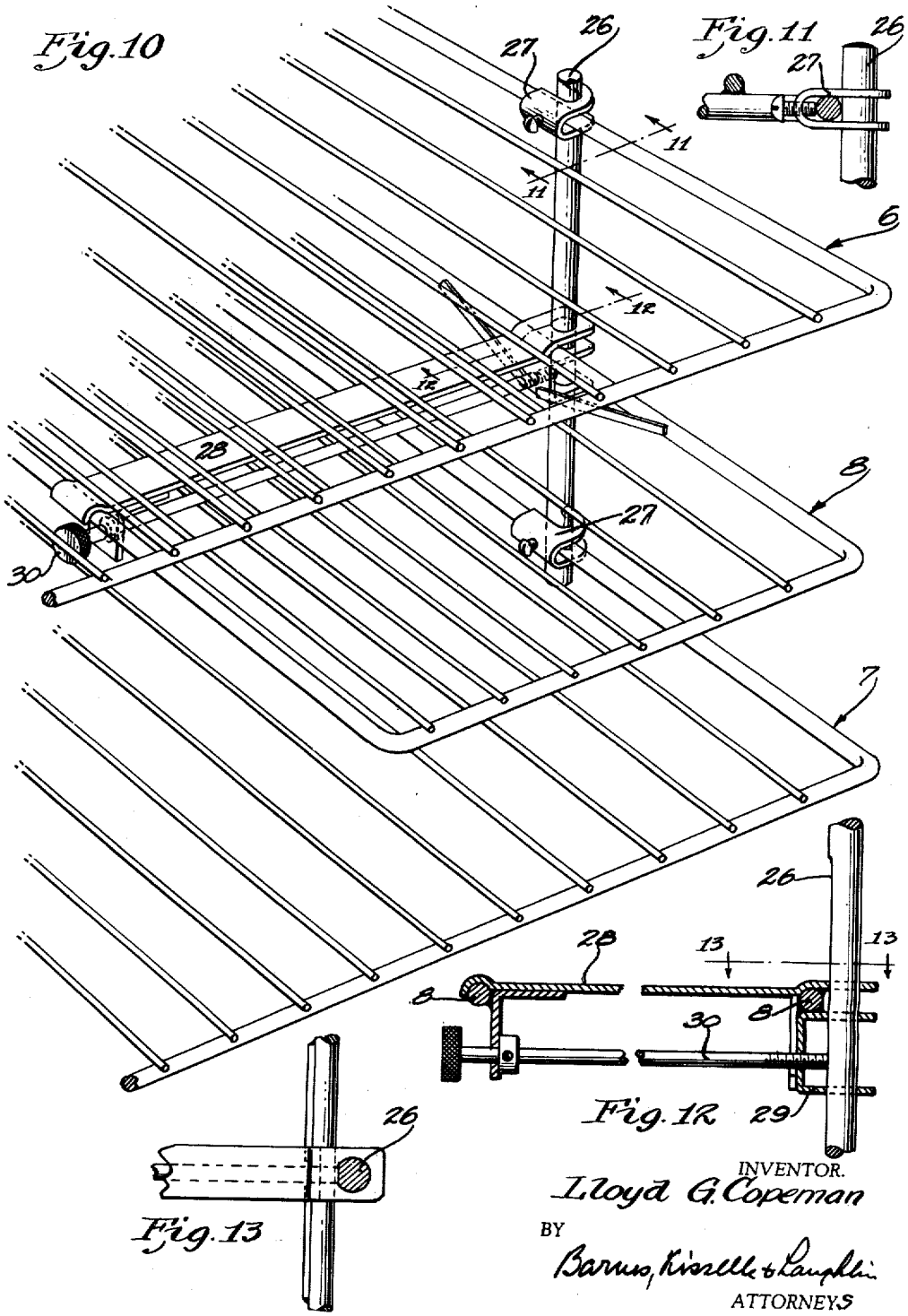
INVENTOR.
Lloyd G. Copeman
BY
Barnes, Kisselle & Laughlin
ATTORNEYS Dec. 31, 1935. L. G. COPEMAN Re. 19,798
REFRIGERATOR STRUCTURE
Original Filed Dec. 23, 1933 5 Sheets-Sheet 5
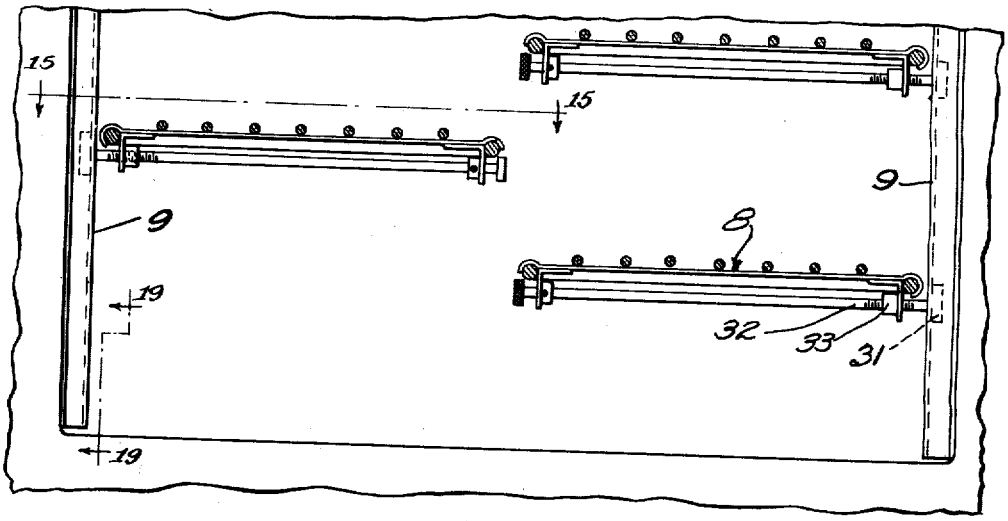
Fig. 14
Fig. 19
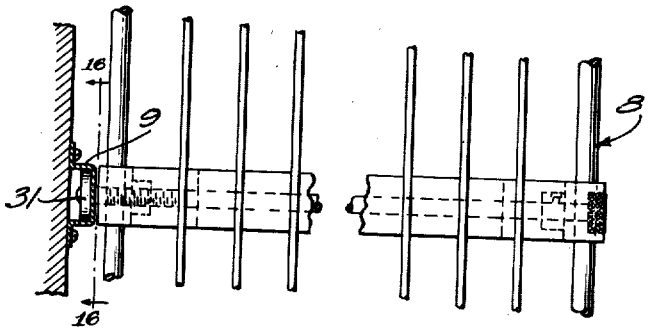
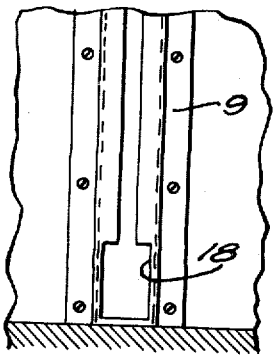
Fig. 15
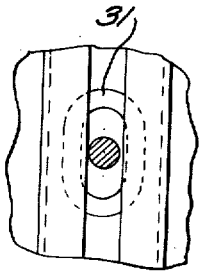
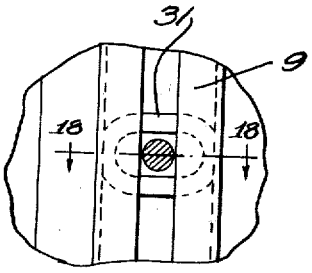
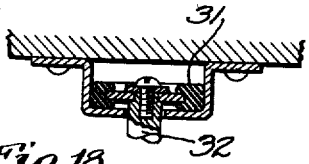
Fig. 18
Fig. 17
Fig. 16
INVENTOR.
Lloyd G. Copeman
BY
Barnes, Kisselle & Laughlin
ATTORNEYS

UNITED STATES PATENT OFFICE 19,798

REFRIGERATOR STRUCTURE

Lloyd G. Copeman, Flint, Mich.

Original No. 2,002,339, dated May 21, 1935, Serial No. 703,744, December 23, 1933. Application for reissue November 7, 1935, Serial No. 48,715

10 Claims. (Cl. 62—89)

This invention has to do with refrigerator structure, and more particularly with food chamber structure making it possible to locate and pack more foodstuffs adjacent the bottom cooler portion of the food chamber.

The design and arrangement of shelves in the food compartments of domestic refrigerators have for some long time presented quite a problem. This is particularly true of the smaller boxes, say, from three and one-half to five cubic feet, and even more so where the refrigerating mechanism is contained within the domestic refrigerator cabinet. To give the idea that the food compartment is of relatively large capacity, the shelves, in recent years, have been positioned very close to each other, making it difficult not only to reach objects at the rear of the shelves, but also making it impossible to place larger objects between the shelves.

It is an object of the present invention to materially increase both the shelf capacity and the effective cubic storage capacity of the food chamber of a domestic refrigerator and to accomplish this increase in such a manner as to make it possible to store and pack more food stuff towards the lower portion of the food compartment. There must, of necessity, be circulation of the air currents within the air compartment, and one of the features of the present invention is the ability to place food stuffs which formerly would have to be placed upon some of the upper shelves, in the lower portion of the food compartment so as to have the benefit of the cooler air currents.

More specifically, it is an object of the present invention to provide a vertically adjustable shelf between two normal fixedly positioned shelves, said vertically adjustable shelf extending less than the full distance across the food compartment, thus making it possible to fill the space between the two fixed shelves with larger objects or to place large objects at one side of said space and two layers of smaller objects at the other side of said space; or, in the event that two vertically adjustable half shelves are used, to obtain substantially any arrangement desired.

Another object of the invention is to provide half shelves which may be easily adjustable vertically with a single hand, making it possible to easily reach and adjust the half shelf while holding one or more articles in the other hand.

Other features, including various arrangements of half shelves, the manner of slidably positioning the same in the food compartment wall or supported from fixedly positioned shelves, the manner of nesting the half shelf inside the fixed shelf when not in use, and other details of construction and arrangement will be more clearly set forth in the specification and claims.

In the drawings:

Figs. 2, 3 and 4 are fragmentary elevations of one manner of supporting vertically adjustable full or half shelves from fixedly positioned shelves.

Fig. 5 is a fragmentary plan view taken on line 5—5 of Fig. 3.

Fig. 6 is a fragmentary sectional view taken on line 6—6 of Fig. 6a, showing one manner of controlling the vertical adjustment of the shelf from the front of the food compartment.

Fig. 6a is a fragmentary plan view, partly broken away, showing the manner of slidably supporting the shelf and the means for controlling the vertical adjustment.

Fig. 6b is a fragmentary sectional view taken on line 6b—6b of Fig. 6a.

Fig. 10 is an enlarged fragmentary detail view illustrating a half shelf and support therefor mounted upon two fixed shelves.

Fig. 11 is a sectional view taken on line 11—11 of Fig. 10.

Fig. 12 is a detail sectional view taken on line 12—12 of Fig. 10.

Fig. 13 is a fragmentary sectional view taken on line 13—13 of Fig. 12.

Fig. 14 is a fragmentary front elevation of a portion of a food chamber provided with vertically adjustable half shelves.

Fig. 15 is a fragmentary plan view taken on line 15—15 of Fig. 14.

Figs. 16 and 17 are fragmentary views taken on line 16—16 of Fig. 15 and illustrating the cam member in two positions of adjustment.

Fig. 18 is a sectional view taken on line 18—18 of Fig. 16.

Fig. 19 is a view taken on line 19—19 of Fig. 14 illustrating the construction of the lower end of the vertical slide for the half shelves.

Figure 1:
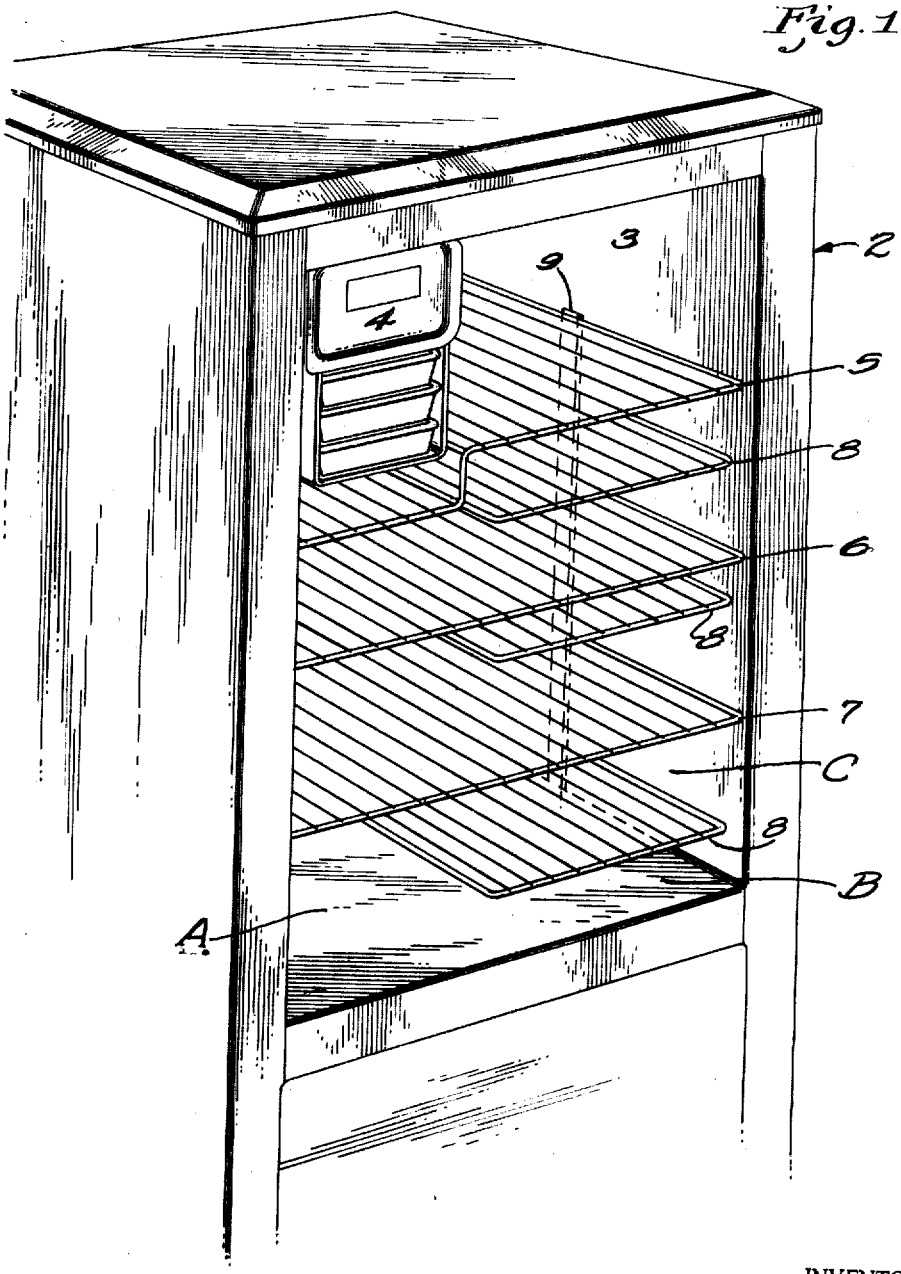
Fig. 1 is a perspective view of a domestic refrigerator cabinet embodying three half shelves in accordance with the present invention.

In all embodiments of the present invention there will be present in the refrigerator 2, such as shown in Fig. 1, some form of food compartment 3 having a cooling unit 4 positioned to set up a circulation of air to produce a cooling effect. In the preferred form of the invention, and as somewhat diagrammatically illustrated in Fig. 1, there will be permanent shelves 5, 6, and 7 formed of spaced bars to permit a circuitous passageway of air around the food compartment. In between each permanent shelf 5, 6 and 7 I preferably locate vertically adjustable half shelves 8. It will be understood that throughout the specification and claims where the words "half shelf" are used I am not necessarily referring to a shelf which extends just half way across the food compartment, but to a shelf which is of somewhat less width than the food compartment so as to permit the placing of at least one large article between permanent shelves.

A vertical support 9, details of which will be described later, slidably carries the half shelves 8 so as to permit their easy vertical adjustment. Each shelf 8 is slightly smaller in outer contour than the corresponding contour of the shelf immediately above the same, so that if each half shelf is moved to the limit of its vertical adjustment, it will be nested within the outer edge of the fixed shelf so that, if the entire space between two fixed shelves is required for large articles of food it is, of course, available.

Referring to the space between the fixed shelf 7 and the bottom of the food compartment, Fig. 1, it will be seen that large articles or tall articles may be placed in the space marked A. A pie or other relatively flat or a plurality of flat articles may be placed in the space marked B. The half shelf 8 may then be lowered to a position just above said pie or other relatively flat articles, thus leaving the space C for receiving other relatively small articles compared with those within the space A. The result is that by means of the vertically adjustable half shelf 8 it is possible to completely fill the space between the fixed shelf 7 and the bottom of the food compartment with a plurality of different sized articles to be cooled. As the shelves are all formed of spaced bars, it will be seen that the cold air from the cooling unit will drop down and pass over the articles of food in the space below the shelf 7. The bottom of the food compartment is, of necessity, maintained at a lightly lower temperature than the rest of the food compartment and by making it possible to greatly increase the capacity of the portion of the food compartment below the shelf 7 it will be seen that it is possible to place more articles of food in the cooler zone of the food compartment.

The adjustable half shelf 8 between the fixed shelves 6 and 7 will make it possible to store a larger quantity of food between such shelves 6 and 7, with the result that the half shelves 8 make it ordinarily possible to store substantially the same amount of food in the lower half of the food compartment as was formerly possible to store in the entire food compartment.

In Figs. 2 to 4 I have illustrated a modified embodiment of the invention wherein a fixedly positioned shelf 10 is shown provided with a downwardly depending leg 11 having serrations 12 for adjustably supporting a shelf 13 by means of the pivoted loop 14 and a small leg 15 cooperating with the serrations 12. The shelf 13 adjustably supported by the fixedly positioned shelf 10 may extend all the way across the food compartment as shown in Fig. 2, but preferably only extends part way across, as shown at 13a in Fig. 4. A half shelf may be supported on each side of the fixedly positioned shelf or the fixedly positioned shelf may be provided with an upwardly extending lug 12a for supporting half shelves both above and below. It will be seen by referring to Fig. 3, that the vertically adjustable shelves 13 or 13a are nestled within the fixedly positioned shelf 10 in their upper position. The transverse bars 16 and 17 on the respective shelves are preferably staggered so as to permit substantially complete nesting of the adjustable shelf within the fixedly positioned shelf.

In the modification illustrated in Figs. 6, 6a, and 6b, I have shown a half shelf of the type that may be conveniently used with the standard type of fixedly positioned shelf, such as shown in Fig. 1. The permanent shelves of the type shown at 5, 6 and 7 in Fig. 1 may be slightly cut away to receive a vertical slide or guideway 9. This guideway is located on one side wall of the food compartment, preferably about half way back from the front edge. The bottom of this guide is apertured at the bottom end as at 18 to receive suitable roller members 19 carried by an inwardly projecting part 20 of the half shelf 8. A rubber covered eccentric 21 is carried by the half shelf and an actuating rod 22 extends forwardly of the half shelf so as to be readily accessible by one opening the door of the refrigerator. By moving the eccentric 21 clockwise, as viewed in Fig. 6, it will be seen that a half shelf can be moved vertically, up or down, the rollers 19 assisting in such easy movement; then by moving the eccentric member clockwise, it will be seen that the half shelf is temporarily located in position; the greater the weight upon the shelf, the more rigid will become the friction fit because of the eccentric. The edges 23 of the half shelf are so fabricated as to outer dimensions as to nicely nestle within the outer edges of the fixedly positioned shelf above the half shelf.

Figure 7:
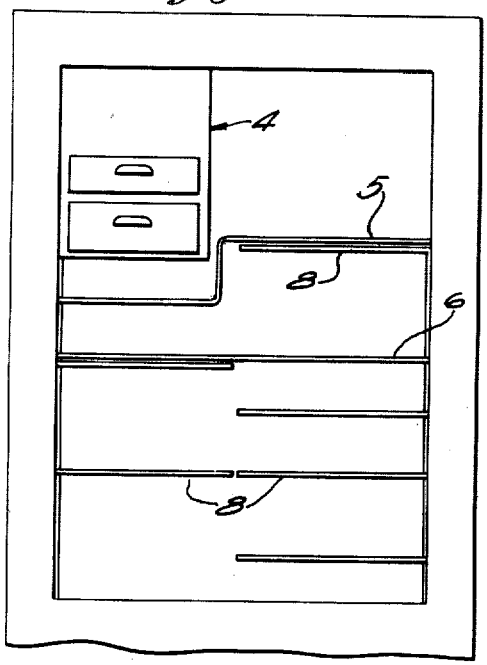
Fig. 7 is a somewhat diagrammatic view illustrating a combination of fixedly positioned full shelves and adjustable half shelves.
Figure 8:
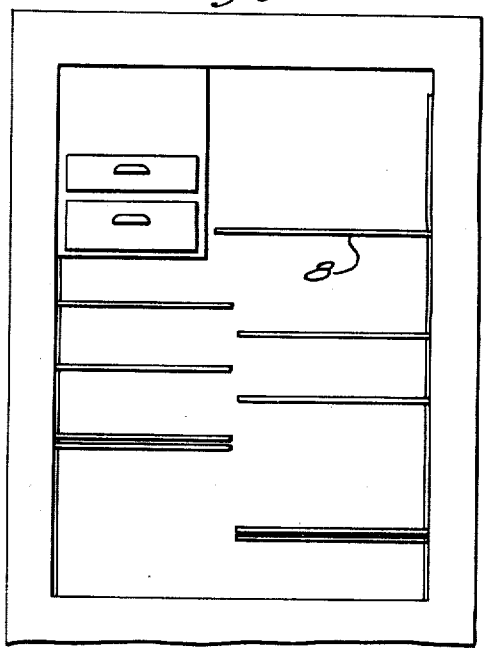
Fig. 8 is a view similar to Fig. 7 but showing a modified arrangement of a food chamber equipped completely with vertically adjustable half shelves.

Figs. 7 and 8 illustrate diagrammatically various possible arrangements that may be obtained by using my half shelves entirely or in combination with fixedly positioned shelves. Half shelves 8 are shown positioned on each side beneath the full shelf 6 so the large articles may be positioned at the left and two layers of small articles at the right. Instead of a full shelf 7, as shown in Fig. 1, I show two vertically adjustable half shelves 8 so as to provide even further possible arrangements of shelving. In Fig. 8 all the shelves are shown as being vertically positioned half shelves 8; it being understood that the two sets of lower shelves on each side would in reality be nestled together, but they are shown slightly separated in the figure to show that there are two shelves in each set.

Figure 9:
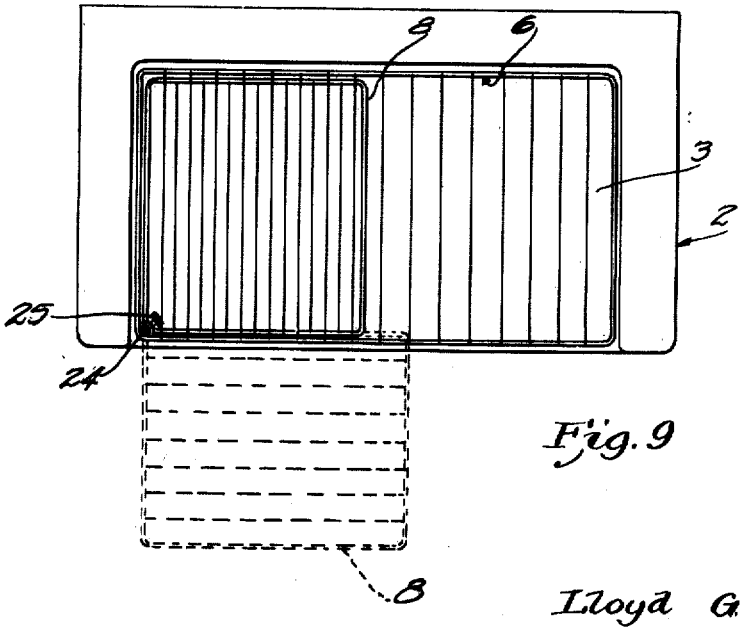
Fig. 9 is a plan view of a modified arrangement of half shelf wherein said shelf is positioned at one of the front corners of the food compartment to permit lateral swinging in addition to vertical adjustment.

In the modification illustrated in Fig. 9 the half shelf 8 is shown as being vertically slidable as on a shaft 24. The position of this vertical shaft at the forward corner of the food compartment makes it possible to swing the half shelf 8 to the position shown in dotted lines. Thus the thumb screw 25 may be loosened to permit adjustment of the half shelf vertically and the half shelf itself may be preferably swung out or back about the pivot shaft 24 whether the thumb screw is tightened or loosened. The manner of nesting one half shelf within the full shelf is well illustrated in this figure.

Figs. 10 to 13 are enlarged detail modifications over the type of shelf structure illustrated in Figs. 2 to 5. In this modification the standard 26 is clamped at the top and bottom to the fixedly mounted full shelves 6 and 7 as by means of clamps 27. A reinforcing piece 28 is secured to the half shelf 8 and a laterally reinforced guide member 29 embraces the standard 26 and is adapted to receive the threaded inner end of an adjusting and clamping rod 30. With this construction it is possible to adapt one or a plurality of half shelves to practically any type of fixedly mounted shelves now in use in domestic refrigerators. By merely reaching in with the hand and unscrewing the member 30 and placing the fingers underneath the half shelf, one can easily raise or lower the shelf and then tighten the same.

A sort of modification between the types of structure shown in Figs. 6 to 6b and 10 to 13 is illustrated in Figs. 14 to 19. In this embodiment I have shown vertically positioned guide members 9 at each side of the food compartment, similar to those disclosed in Figs. 1 to 6, the guide members being open at the bottom as at 18 to receive the guiding member 31 carried by the inner end of a threaded shaft 32; that is, the shaft 32 is threaded through a portion 33 carried by the half shelf 8. The guide or clamping member 31 at the inner end of the rod 32 is generally elliptical in shape, as best shown in Figs. 16 and 17, and in the preferred form is made of rubber or similar flexible material. This clamping and guiding member may be slipped into the opening 18 at the bottom of the guide 9 and the half shelf moved to any position desired.

By turning the member 31 vertically to the position shown in Fig. 7 it will be seen that the shelf can be raised and lowered and then clamped into position by further turning of the rod 32 which will cause the ends of the resilient member 31 to contact with the side walls of the guide 9 to frictionally hold the shelf in position.

It will be seen that in all the modifications embodying the half shelves and particularly those illustrated in Figs. 1 and 14, the half shelves are in direct heat conducting relation with the side walls of the food compartment, that is, either directly through the sliding supports or through the fixedly positioned shelves, or otherwise; thus, even though it will be possible to store a plurality of small articles, say, tomatoes, on top of a plurality of other small articles or packages, say, cheese or butter, an increased cooling effect will be obtained in food compartments embodying the present invention because of the direct heat transfer from the article supported by the half shelf, through the half shelf and through the walls of the food compartment. Furthermore, the half shelves add a much greater surface area and a materially greater mass of metal to the food compartment so that, in addition to the increased cooling effect, an added hold-over effect is obtained at all times regardless of whether the half shelves carry food or are nestled within the fixedly positioned shelves.

What I claim is:

1. In combination with a refrigerator of the type having a food compartment, a perforate fixedly mounted shelf extending across the food compartment and spaced from the bottom of the main food compartment to form an auxiliary food compartment to receive articles of fairly large size, a cooling unit positioned in the food compartment for setting up a positive circulation of air in the compartment and through said shelf, a vertically adjustable perforate half shelf positioned beneath said fixedly positioned shelf, said half shelf being substantially flat and including micro-adjustment means for moving said half shelf from a point where said half shelf substantially merges with said fixed shelf to a point where said shelf substantially merges with the horizontal bottom of the food compartment whereby said entire space below the fixed shelf may be filled with large articles all the way across or said half shelf may be selectively adjusted to any position above smaller articles supported by the bottom of the food compartment and below the half shelf and thus permit the storing of food between the lowered half shelf and the fixedly mounted shelf to thereby permit filling at all times the entire vertical space between the fixedly positioned shelf and the bottom of the compartment, said half shelf increasing the mass of hold-over material within the food compartment without taking up any usable space and so connected with a wall of the food compartment as to accelerate the transfer of heat from food-stuffs placed thereon by heat conduction through the shelf and food compartment walls, said micro-adjustment means being readily accessible from the front of the compartment and so arranged as to permit operation of the adjustment means and movement of the shelf with one hand.

2. In combination with a refrigerator of the type having a food compartment, a perforate fixedly mounted shelf extending across the food compartment and spaced from the bottom of the main food compartment to form an auxiliary food compartment to receive articles of fairly large size, a cooling unit positioned in the food compartment for setting up a positive circulation of air in the compartment and through said shelf, a vertically adjustable perforate half shelf positioned beneath said fixedly positioned shelf, said half shelf being substantially flat and including micro-adjustment means for moving said half shelf from a point where said half shelf substantially merges with said fixed shelf to a point where said shelf substantially merges with the horizontal bottom of the food compartment whereby said entire space below the fixed shelf may be filled with large articles all the way across the said half shelf may be selectively adjusted to any position above smaller articles supported by the bottom of the food compartment and below the half shelf and thus permit the storing of food between the lowered half shelf and the fixedly mounted shelf to thereby permit filling at all times the entire vertical space between the fixedly positioned shelf and the bottom of the compartment, said half shelf increasing the mass of hold-over material within the food compartment without taking up any usable space and so connected with a wall of the food compartment as to accelerate the transfer of heat from foodstuffs placed thereon by heat conduction through the shelf and food compartment walls, and means cooperating with said adjustable means for supporting and guiding the shelf, said shelf being vertically movable relative to said last named means and to any desired position without removal from said means.

3. A domestic refrigerating unit comprising a food compartment provided with a plurality of fixedly positioned shelves, refrigeration means positioned in the compartment for setting up a circulation of air through the fixedly positioned shelves, one or more half shelves positioned between said fixedly positioned shelves and movable in a general vertical direction of adjustment whereby relatively large articles may be positioned on one side of a fixedly positioned shelf whereby to take up practically all the space on that side, relatively small or flat articles positioned on the other side of the fixedly positioned shelf beneath the half shelf and said half shelf then moved downward to a position above said articles whereby to receive a second layer of relatively small articles between two adjacent fixedly mounted shelves, a guide member mounted in one wall of said compartment for slidably receiving and adjustably positioning the half shelves, and means extending toward an outer edge of each half shelf and readily accessible from the front of the food compartment whereby to permit adjustment of said half shelf, said half shelves being of such dimensions as to nestle in their uppermost position within the fixedly positioned shelves whereby to present a full storage space between the fixedly positioned shelves, if necessary.

4. In combination with a heat exchange unit of the type having a food compartment, a perforate, relatively fixedly mounted shelf extending across the food compartment and spaced from the bottom of the main food compartment to form an auxiliary food compartment to receive articles of fairly large size, heat exchange means positioned in the food compartment for setting up a positive circulation of air in the compartment and through said shelf, a vertically adjustable perforate half shelf positioned beneath said fixedly positioned shelf, said half shelf being substantially flat and including micro-adjustment means for moving said half shelf from a point where said half shelf substantially merges with said fixed shelf to a point where said shelf substantially merges with the horizontal bottom of the food compartment whereby said entire space below the fixed shelf may be filled with large articles all the way across or said half shelf may be selectively adjusted to any position above smaller articles supported by the bottom of the food compartment and below the half shelf and thus permit the storing of food between the lowered half shelf and the fixedly mounted shelf to thereby permit filling at all times the entire vertical space between the fixedly positioned shelf and the bottom of the compartment, said half shelf increasing the mass of hold-over material within the food compartment without taking up any usable space and so connected with a wall of the food compartment as to accelerate the transfer of heat from foodstuffs placed thereon by heat conduction through the shelf and food compartment walls.

5. A domestic heat exchange unit comprising a food compartment provided with a plurality of fixedly positioned shelves, heat exchange means positioned in the compartment for setting up a circulation of air through the fixedly positioned shelves, one or more metallic half shelves positioned between said fixedly positioned shelves each including micro-adjustment means readily accessible to and operable by one hand to permit movement of the entire shelf in a general vertical direction of adjustment whereby relatively large articles may be positioned on one side of a fixedly positioned shelf whereby to take up practically all the space on that side, relatively small or flat articles positioned on the other side of the fixedly positioned shelf beneath the half shelf and said half shelf then moved downward to a position above said articles whereby to receive a second layer of relatively small articles between two adjacent fixedly mounted shelves, said metallic half shelf adding surface area and mass over that provided by the fixedly positioned shelves to accelerate transfer of heat units relative to foodstuffs placed thereon and to increase the hold over at all times.

6. A domestic heat exchange unit comprising a food compartment provided with a plurality of fixedly positioned shelves, heat exchange means positioned in the compartment for setting up a circulation of air through the fixedly positioned shelves, one or more relatively flat half shelves positioned between said fixedly positioned shelves and movable in a general vertical direction of adjustment whereby relatively large articles may be positioned on one side of a fixedly positioned shelf whereby to take up practically all the space on that side, relatively small or flat articles positioned on the other side of the fixedly positioned shelf beneath the half shelf and said half shelf then moved downward to a position above said articles whereby to receive a second layer of relatively small articles between two adjacent fixedly mounted shelves, a guide member mounted in one wall of said compartment for slidably receiving and adjustably positioning the half shelves, and micro-adjustment means having a member extending toward an outer edge of each half shelf and readily accessible from the front of the food compartment whereby to permit instantaneous adjustment of said half shelf to any selective position.

7. A domestic heat exchange unit comprising a food compartment provided with a relatively fixedly mounted shelf, heat exchange means positioned in the compartment for setting up a circulation of air through the fixedly positioned shelf, one or more half shelves positioned between said fixedly positioned shelf and the bottom of the food compartment and movable in a general vertical direction of adjustment whereby relatively large articles may be positioned on one side of a fixedly positioned shelf whereby to take up practically all the space on that side, relatively small or flat articles positioned on the other side of the fixedly positioned shelf beneath the half shelf and said half shelf then moved downward to a position above said articles whereby to receive a second layer of relatively small articles between two adjacent fixedly mounted shelves, said shelves being relatively flat to provide hold-over mass without taking up useful space, and means extending toward an outer edge of each half shelf and readily accessible from the front of the food compartment whereby to permit adjustment of said half shelf, said half shelves being of such dimensions as to nestle in their uppermost position within the fixedly positioned shelves whereby to present a full storage space between the fixedly positioned shelves, if necessary.

8. In a cabinet having a food compartment, heat exchange means positioned within the compartment, and a plurality of perforate half shelves extending less than the full width of the compartment, said shelves being slidably mounted as a part of the cabinet, and micro-adjustment means forming a part of the shelf and cooperating with the slidable mounting whereby the shelves may be vertically adjustable without removal from the slidable mounting, said micro-adjustment means being readily accessible from the front of the food compartment whereby said shelves may be adjusted vertically relative to the walls of said compartment and to each other whereby to present a plurality of storage compartments of varying sizes, positions and locations, at least one of any two adjacent shelves being substantially flat to permit of full vertical movement up or down whereby the respective vertical top and bottom positions of said substantially flat shelf will substantially merge with the shelf thereabove at the top or bottom thereof.

9. In a heat exchange unit having a food compartment, a heat exchange member for circulating air therethrough and a plurality of half shelves extending less than the full width of the compartment and mounted for vertical adjustment relative to the walls of the said compartment and to each other whereby to present a plurality of storage compartments of varying sizes, positions and locations, at least one of said half shelves being both vertically adjustable and transversely swingable.

10. In combination with a cabinet of the type having a food compartment, one or more perforate, relatively fixedly mounted shelves in said compartment, and a heat exchange member for setting up a circulation of air in said compartment, a guide for receiving a vertically adjustable half shelf positioned beneath one of said perforate fixedly positioned shelves whereby to permit the storage of food in a space beneath said fixedly positioned shelf which would otherwise be unused above relatively small or flat articles, said half shelf being movable laterally about said guide so that it may be moved to a position at the front of the food compartment.

LLOYD G. COPEMAN.

CERTIFICATE OF CORRECTION.

eissue No. 19,798. December 31, 1935.

LLOYD G. COPEMAN.

It is hereby certified that error appears in the printed specification of the above numbered patent requiring correction as follows: Page 3, second column, line 51, claim 2, for "the" second occurrence, read or; and that the said Letters Patent should be read with this correction therein that the same may conform to the record of the case in the Patent Office.

Signed and sealed this 4th day of February, A. D. 1936.

Leslie Frazer

Seal) Acting Commissioner of Patents.